L. L. PRITZL.
TYPE WRITING MACHINE.
APPLICATION FILED OCT. 4, 1912.
1,153,252.
Patented Sept. 14, 1915.
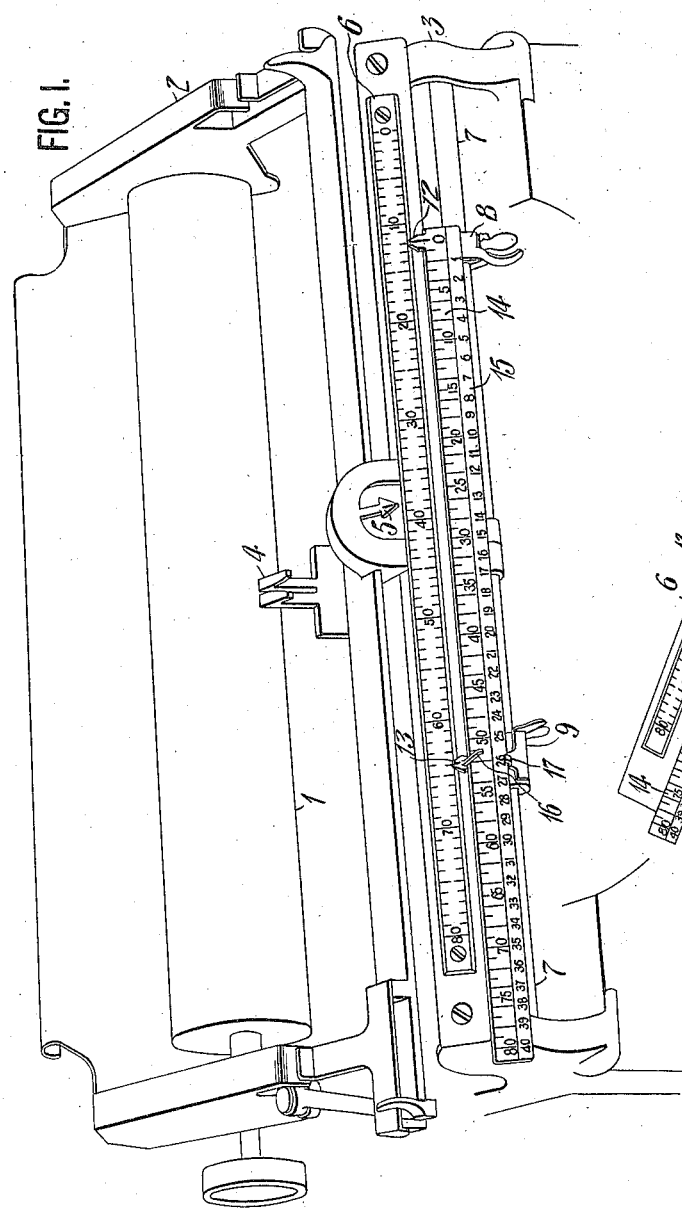
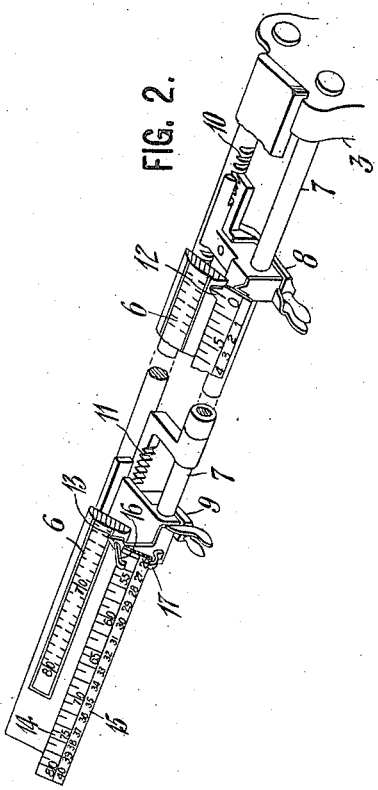

UNITED STATES PATENT OFFICE.

LORENZ L. PRITZL, OF NEW YORK, N. Y., ASSIGNOR TO UNDERWOOD TYPEWRITER COMPANY, OF NEW YORK, N. Y., A CORPORATION OF DELAWARE.

TYPE-WRITING MACHINE.

1,153,252.  Specification of Letters Patent.  Patented Sept. 14, 1915.

Application filed October 4, 1912. Serial No. 723,836.

*To all whom it may concern:*

Be it known that I, LORENZ L. PRITZL, a citizen of the United States, residing in New York, in the county of New York and State of New York, have invented certain new and useful Improvements in Type-Writing Machines, of which the following is a specification.

My invention relates to typewriting machines, and particularly to the scales by which the various letter-spaces of said machines may be readily identified, and is preferably used in connection with margin stops by which the travel of the typewriter carriage is limited.

The invention provides a simple and practical means for instantly determining without any mental calculation, the center of any line of writing for which the margin stops are set, and is thus of special value in placing titles, headings, etc., in the center of a line, whether the margin stops are adjusted for a full-length line or a short line.

The invention is herein shown as applied to an Underwood typewriting machine having the usual scale on the frame of the typewriter and a pointer fast on the traveling carriage, which carriage carries the work-sheet. Associated with said scale fast on the typewriter frame is a second scale shiftable relatively thereto, which is herein shown as attached to the right hand margin stop. This scale may comprise two different scales, one divided into divisions of the same character as those on the main scale, while the other or auxiliary scale may be divided into divisions of twice the size. The number of any division on this second or auxiliary scale may indicate half the number of letter-spaces to the division point on the first scale in line therewith, *i. e.* in writing a line to that point the number indicates the number of letter-spaces between the beginning and the center of the line. The left-hand margin stop of the typewriter may coöperate with this auxiliary scale and with the main scale of the typewriter and carry a pointer so as to indicate at once on the auxiliary scale the number of letter-spaces from the right-hand margin-stop; and in so indicating said letter-spaces, it may also indicate the number of letter-spaces from the right-hand margin stop to the middle of the line so written.

Other features and advantages will hereinafter appear.

In the accompanying drawings, Figure 1 is a perspective view of so much of a typewriting machine as is necessary for illustrating my invention. Fig. 2 is a fragmentary perspective view showing the relation of the margin stops to the scales.

In the ordinary Underwood typewriting machine, keys (not shown) cause types (not shown) to strike a work-sheet on a platen 1 mounted in a traveling carriage 2, which carriage is arranged to be drawn along the typewriting machine frame 3, on which it is supported, in a letter-feeding movement by means of a spring (not shown), and is controlled in said movement by the operation of said keys. The types strike a work-sheet on the platen at a type-guide 4 at the printing point. Said carriage 2 carries a pointer 5 which is arranged opposite the center of the platen 1 and shows on a scale 6 fast on the front frame 3 of the typewriting machine the number of the letter-space at which the type at the moment will print. Also mounted on the frame of the typewriting machine is a fixed rod 7 on which a right-hand margin stop 8 and a left-hand margin stop 9 are slidably adapted, said stops arranged to lock with racks 10 and 11 to correspond with the letter-spaces of the scale 6. Said stops 8 and 9 carry pointers 12 and 13 respectively, arranged to read on the main scale 6 and thus indicate the letter-spaces at which they are set.

Fast on the right-hand margin stop 8 is a sliding scale 14 divided into letter-spaces like the main scale 6, and extending from said margin stop toward the left-hand end of the machine, the pointer 12 being located at the "0" of this scale 14 and being formed as a projection thereof. Said sliding scale 14 also carries an auxiliary scale 15 having its spaces numbered so that each space on said scale has a number half the value of the corresponding space on the sliding scale itself. The pointer 13 carries a second pointer 16 which is arranged to overlap said sliding scale and show at what point on said sliding scale said margin stop 9 carrying said pointer 16 stands, but which extends outwardly so as to allow relative movement of the scale 14 and stop 9. The sliding scale 14 preferably extends to nearly the same length as the main scale 6, and is carried at its left-hand end as a slide between said pointer 16 and a bracket 17 on the margin stop 9, which bracket is bent up so as to slightly overlie said auxiliary scale 15 and forms a pointer for said auxiliary scale.

It will be seen that when the right-hand margin stop is placed in any position such as a space "12", as seen in Fig. 1, the pointer 16 of the left-hand margin stop will indicate the number of letter-spaces in the line which can be written between said stops, and at the same moment the pointer 17 will indicate on the auxiliary scale 15 the center letter-space on said line. As seen in Fig. 1, with the left-hand margin stop placed at letter-space "64", the length of the line which can be written is shown by pointer 16 to be fifty-two letter-spaces and the center of the line is shown by pointer 17 at letter-space "26" from the right-hand margin stop.

The alternate graduations on the sliding scale 14 are preferably extended to the auxiliary scale, and in said auxiliary scale every one of said alternate spaces is numbered, thus rendering the mental effort of locating the center of the line absolutely *nil*. The sliding scale 14 except for the lengthening of the alternate graduations is graduated practically identically with the main scale 6. It will be seen that the mere location of the margin stops at once adjusts all the scales for all purposes, and that the scales themselves do the computing necessary in locating a line.

Variations may be resorted to within the scope of the invention, and portions of the improvements may be used without others.

Having thus described my invention, I claim.

1. In a typewriting machine, the combination, with a carriage, and a pointer thereon; of a scale fixed on the machine frame and with which said pointer coöperates to indicate the printing point; a scale parallel with the fixed scale and shiftable with relation to the same; and a pair of relatively-shiftable margin stops, to one of which the shiftable scale is secured to be shifted thereby, both stops having pointers coöperative with said fixed scale, and one stop having a pointer coöperative with said shiftable scale.

2. In a typewriting machine, the combination of a pair of parallel scales mounted adjacent to each other on the machine frame, one scale being shiftable with relation to the other; a carriage; a pointer on said carriage coöperative with said other scale to indicate the printing point; and a pair of relatively-shiftable margin stops, to one of which the shiftable scale is secured to be shifted thereby, both stops having pointers coöperative with said other scale, and one stop having a pointer coöperative with said shiftable scale.

3. In a typewriting machine, the combination of a pair of parallel scales mounted adjacent to each other on the machine frame, one scale being shiftable with relation to the other, and both scales having similarly-numbered letter-space divisions; a carriage; a pointer on said carriage coöperative with said other scale to indicate the letter-space where the printing point stands; and a pair of relatively-shiftable margin stops, to one of which the shiftable scale is secured to be shifted thereby, said stops having pointers coöperative with said other scale to indicate the initial and terminal letter-spaces of an arbitrary line of writing, and one stop having a pointer coöperative with said shiftable scale to indicate the number of letter-spaces comprehended in such line.

4. In a typewriting machine, the combination of a pair of parallel scales mounted adjacent each other on the machine frame and extending in the same direction, one scale being shiftable with relation to the other, and both scales having similarly-numbered letter-space divisions; a carriage; a pointer on said carriage coöperative with said other scale to indicate the letter-space where the printing point stands; an adjustable beginning-of-the-line gage to which the shiftable scale is secured at one end to be shifted thereby, said gage having a pointer located at the "0" of said shiftable scale for coöperation with said other scale to indicate on the latter the letter-space at the beginning of an arbitrary line of writing; and an end-of-the-line gage adjustable toward and from the first-named gage and having a pointer for coöperation with said other scale to indicate thereon the letter-space at the end of such line, and a second pointer for coöperation with said shiftable scale to indicate thereon the number of letter-spaces comprehended in said line.

5. In a typewriting machine, the combination of a pair of parallel scales mounted adjacent each other on the machine frame and extending in the same direction, one scale being shiftable with relation to the other, and both scales having similarly-numbered letter-space divisions; a carriage, a pointer on said carriage coöperative with said other scale to indicate the letter-space where the printing point stands; an adjustable beginning-of-the-line gage to which the shiftable scale is secured at one end to be shifted thereby, said gage having a pointer located at the "0" of said shiftable scale for coöperation with said other scale to indicate on the latter the letter-space at the beginning of an arbitrary line of writing; and an end-of-the-line gage adjustable toward and from the first-named gage and having a pointer for coöperation with said shiftable scale to indicate thereon the number of letter-spaces comprehended in such line.

6. In a typewriting machine, the combination of a pair of parallel scales mounted adjacent to each other on the machine frame, one of said scales being fixed, and the other shiftable with relation thereto, and both scales having similarly-numbered letter-space divisions; a carriage; a pointer on said carriage coöperative with the fixed scale to indicate the letter-space where the printing point stands; a shiftable margin stop to which the shiftable scale is secured to be shifted thereby, said stop having a pointer located at the "0" of said shiftable scale for coöperation with said fixed scale to indicate on the latter the letter-space at one end of an arbitrary line of writing; and a margin stop shiftable toward and from the first-named stop and having a pointer for coöperation with said shiftable scale to indicate thereon the number of letter-spaces comprehended in such line, said shiftable scale being provided with an auxiliary scale for indicating the letter-space at the center of said line.

7. In a typewriting machine, the combination of a pair of parallel scales mounted adjacent each other on the machine frame, one of said scales being fixed and the other shiftable with relation thereto, and both scales having similarly-numbered letter-space divisions; a carriage; a pointer on said carriage coöperative with the fixed scale to indicate the letter-space where the printing point stands; and a pair of relatively-shiftable margin stops, to one of which the shiftable scale is secured to be shifted thereby, said stops having pointers coöperative with said fixed scale to indicate the initial and terminal letter-spaces of an arbitrary line of writing, and one stop having an additional pointer coöperative with said shiftable scale to indicate the number of letter-spaces comprehended in such line, said shiftable scale being provided with an auxiliary scale for indicating the letter-space at the center of said line.

8. In a typewriting machine, the combination of a pair of parallel scales mounted adjacent to each other on the machine frame, one scale being shiftable with relation to the other; a carriage having a pointer coöperative with said other scale to indicate the printing point; a shiftable margin stop having a pointer coöperative with said other scale to indicate one end of an arbitrary line of writing; and a margin stop shiftable toward and from the first-named stop and having a pointer coöperative with said other scale to indicate the other end of such line, said shiftable scale being secured to one stop to be shifted thereby, and extending to the other stop to indicate the length of such line, and being provided with an auxiliary scale which is co-extensive therewith, to indicate the center of said line.

9. In a typewriting machine, the combination with a traveling carriage, of a rod, margin stops adjustable along said rod, a scale plate adjustable with one margin stop, and provided with two series of indexed scale markings, the indices of one series indicating spaces of double the length of those indicated by the other series, a pointer adjustable with the scale plate, and pointers adjustable with the other stop.

10. In a typewriting machine, the combination with a traveling carriage, of an indicator on said carriage, a scale on the frame of the machine, a second scale adjacent to said first scale and shiftable relatively thereto, both scales being permanently exposed to view, a margin stop carrying said second scale, a second margin stop adjustable relatively thereto, and separate pointers for said scales carried by one of said margin stops.

11. In a typewriting machine, the combination with a traveling carriage, of an indicator on said carriage, a scale on the frame of the machine, margin stops adjacent to said scale and carrying indicators therefor, and a second scale fast on one of said margin stops arranged to be read by an indicator on the other, both said scales being permanently exposed to view, and one of said margin stops carrying separate pointers for said scales.

12. In a typewriting machine, the combination with a traveling carriage, of an indicator on said carriage, a scale on the frame of the machine, margin stops adjacent to said scale and carrying indicators therefor, a second scale fast on one of said margin stops, arranged to be read by an indicator on the other, and an auxiliary scale fast on said second scale for determining the arrangement of spaces on the work-sheet, all of said scales being permanently exposed to view, and one of said margin stops carrying separate pointers for all of said scales.

13. In a typewriting machine, the combination with a traveling carriage, of an indicator on said carriage, a scale on the frame of the machine, an indicator to show where a line may be begun, an indicator to show where a line will end, a scale fast on one of said indicators showing the letter-spacing to the next indicator, and an auxiliary scale showing the relation of said spacing to the printing point, all of said scales being permanently exposed to view, and one of said margin stops carrying separate pointers for all of said scales.

14. In a typewriting machine, the combination with a traveling carriage, of an indicator on said carriage, a scale on the frame of the machine, a margin stop settable along said scale for determining the beginning of a line, a margin stop settable along said scale for determining the end of a line, a scale carried on one of said stops and extending to the other to indicate the length of the line between them, and an auxiliary scale indicating the letter-space at the center of said line, all of said scales being permanently exposed to view, and one of said margin stops carrying separate pointers for all of said scales.

15. In a typewriting machine, the combination with a traveling carriage, of margin stops for said carriage, a scale for indicating the letter-space at which the printing point of said carriage stands, and a scale on one of said margin stops extending toward the other stop, both said scales being permanently exposed to view, and one of said margin stops carrying separate pointers for said scales.

16. In a typewriting machine, the combination with a traveling carriage, of margin stops for said carriage, a scale for indicating the letter-space at which the printing point of said carriage stands, a scale on one of said margin stops extending toward the other stop, and an auxiliary scale indicating the central letter-space between said stops, all of said scales being permanently exposed to view, and one of said margin stops carrying separate pointers for all of said scales.

LORENZ L. PRITZL.

Witnesses:
F. E. ALEXANDER,
TITUS H. IRONS.

Copies of this patent may be obtained for five cents each, by addressing the "Commissioner of Patents, Washington, D. C."